US007389385B2

(12) United States Patent
Serrano et al.

(10) Patent No.: US 7,389,385 B2
(45) Date of Patent: Jun. 17, 2008

(54) METHODS AND APPARATUS TO DYNAMICALLY INSERT PREFETCH INSTRUCTIONS BASED ON COMPILER AND GARBAGE COLLECTOR ANALYSIS

(75) Inventors: Mauricio J. Serrano, San Jose, CA (US); Sreenivas Subramoney, Palo Alto, CA (US); Richard L. Hudson, Florence, MA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 10/742,009

(22) Filed: Dec. 19, 2003

(65) Prior Publication Data

US 2005/0138294 A1 Jun. 23, 2005

(51) Int. Cl.
*G06F 12/00* (2006.01)
*G06F 9/26* (2006.01)
*G06F 9/45* (2006.01)
*G06F 11/30* (2006.01)

(52) U.S. Cl. .................... 711/137; 711/125; 711/3; 711/204; 711/213; 717/145; 717/140; 717/141; 717/153; 717/161; 714/47

(58) Field of Classification Search ............ None
See application file for complete search history.

(56) References Cited

U.S. PATENT DOCUMENTS 5,704,053 A * 12/1997 Santhanam ............. 717/158

6,775,740 B1 * 8/2004 Nishiyama ............. 711/118
6,951,015 B2 * 9/2005 Thompson ............. 717/158
7,058,636 B2 * 6/2006 Coldewey ............. 707/100

OTHER PUBLICATIONS

Chilimbi et al., *Using Generational Garbage Collection to Implement Cache-Conscious Data Placement*, in the Proceedings of the International Symposium on Memory Management 37 (1998).
Calder et al., *Cache-Conscious Data Placement*, in the Proceedings of the Eighth International Conference on Architectural Support for Programming Languages and Operating Systems 139 (1998).

(Continued)

*Primary Examiner*—Hyung S. Sough
*Assistant Examiner*—Mardochee Chery
(74) *Attorney, Agent, or Firm*—Hanley, Flight & Zimmerman, LLC

(57) ABSTRACT

Methods and apparatus to insert prefetch instructions based on garbage collector analysis and compiler analysis are disclosed. In an example method, one or more batches of samples associated with cache misses from a performance monitoring unit in a processor system are received. One or more samples from the one or more batches of samples based on delinquent information are selected. A performance impact indicator associated with the one or more samples is generated. Based on the performance indicator, at least one of a garbage collector analysis and a compiler analysis is initiated to identify one or more delinquent paths. Based on the at least one of the garbage collector analysis and the compiler analysis, one or more prefetch points to insert prefetch instructions are identified.

13 Claims, 5 Drawing Sheets

OTHER PUBLICATIONS

Chilimbi et al., *Cache-Conscious Structure Layout*, in the SIGNPLAN Conference on Programming Language Design and Implementation 1 (1999).

Dimpsey et al., *Java Server Performance: A Case Study of Building Efficient, Scalable Jvms*, 39 IBM Systems Journal 151 (2000).

Arnold et al., *Adaptive Optimization in the Jalapeno JVM: The Controller's Analytical Model*, in ACM Conference on Object-Oriented Programming Systems, Languages, and Applications (2000).

Chilimbi et al., *Dynamic Hot Data Stream Prefetching for General-Purpose Programs*, in the Proceedings of the ACM SIGPLAN Conference on Programming Language Design and Implementation 199 (2002).

Liao et al., *Post-Pass Binary Adaptation for Software-Based Speculative Precomputation*, in the Proceedings of the ACM SIGPLAN Conference on Programming Language Design and Iimplementation 117 (2002).

Luk et al., *Profile-Guided Post-Link Stride Prefetching*, in the Proceedings of the International Conference on Supercomputing 167 (2002).

Shuf et al., *Creating and Preserving Locality of Java Applications at Allocation and Garbage Collection Times*, in the Proceedings of the ACM SIGPLAN Conference on Object-Oriented Programming, Systems, Languages, and Applications 13 (2002).

Inagaki et al., *Stride Prefetching by Dynamically Inspecting Objects*, in the Proceedings of the ACM SIGPLAN Conference on Programming Language, Design and Implementation 269 (2003).

Wu et al., *Value-Profile Guided Stride Prefetching for Irregular Code*, in the Proceedings of the 11th International Conference on Compiler Construction 307 (2002).

International Search Report corresponding to International Application Serial No. PCT/US2004/041101, May 3, 2005.

Written Opinion of the International Searching Authority corresponding to International Application Serial No. PCT/US2004/041101, May 3, 2005.

Choi et al., Design and Experience: Using the Intel® Itanium® 2 Processor Performance Monitoring Unit to Implement Feedback Optimizations, $2^{nd}$ *Workshop on EPIC Architectures and Compiler Technology*, Nov. 18, 2002, pp. 1-11.

Chilimbi T. M. et al., Efficient representations and abstractions for quantifying and exploiting data reference locality, *Proceedings of the ACM Sigplan 2001 Conference on Programming Language Design and Implementation*, Jun. 2001, pp. 191-202, XP002326248, p. 4-5; figure 4.

Jacobson E. et al., Assigning confidence to conditional branch predictions, *Proceedings of the $29^{th}$ Annual IEEE/ACM International Symposium on Microarchitectur, Micro-29*, Dec. 2-4, 1996, *Proceedings of the Annual IEEE/ACM International Symposium on Microarchitecture. (MICRO)*, Los Alamitos, IEEE Comp. Soc. Press, U, vol. SYMP. 29, Dec. 2, 1996, pp. 142-152.

Inagaki, T., Onodera, T., Komatsu, H., Nakatani, T., *Stride Prefetching by Dynamically Inspecting Objects*, Proceedings of the ACM SIGPlan 2003 Conference on Programming Language Design and Implementation, pp. 269-277, XP002326249, p. 274 (Jun. 9, 2003).

Chilimbi, T.M., et al., *Using Generational Garbage Collection to Implement Cache-Conscious Data Placement*, ACM SIGPlan Notices, Association for Computing Machinery, New York, US, vol. 34, No. 3, pp. 37-48, XP000993595, ISSN: 0362-1340, pp. 37-48 (Mar. 1999).

Tabatabai, A., et al., *Prefetch Injection Based on Hardware Monitoring and Object Metadata*, Proceedings of the ACM SIGPlan 2004 Conference on Programming Language Design and Implementation, pp. 267-276, XP002326250, pp. 267-276 (Jun. 9, 2004).

International Preliminary Report on Patentability corresponding to International Application No. PCT/US2004/041101, Jun. 20, 2006, 10 pages.

Johnstone, Mark S., Non-Compacting Memory Allocation and Real-Time Garbage Collection. PhD thesis, University of Texas at Austin, Dec. 1997.

Intel Corporation, "IA-64 Application Developers Architecture Guide," May 1999, pp. 1-476.

\* cited by examiner

METHODS AND APPARATUS TO DYNAMICALLY INSERT PREFETCH INSTRUCTIONS BASED ON COMPILER AND GARBAGE COLLECTOR ANALYSIS

TECHNICAL FIELD

The present disclosure relates generally to compilers, and more particularly, to methods and apparatus to dynamically insert prefetch instructions based on compiler and garbage collector analysis.

BACKGROUND

In an effort to improve and optimize performance of processor systems, many different prefetching techniques (i.e., anticipating the need for data input requests) are used to remove or "hide" latency (i.e., delay) of processor systems. In particular, prefetch algorithms (i.e., pre-execution or pre-computation) are used to prefetch data for cache misses associated with data addresses that are difficult to predict during compile time. That is, a compiler first identifies the instructions needed to generate data addresses of the cache misses, and then speculatively pre-executes those instructions.

In general, linked data structures (LDSs) are collections of software objects that are traversed using pointers found in the preceding object(s). Traversing an LDS may result in a high latency cache miss on each object in the LDS. Because an address of an object in the LDS is loaded from the preceding object before the object itself may be loaded, cache misses may be unavoidable. On the other hand, when accessing a data array structure where the address of subsequent objects may be calculated from the base of the data array structure, loops may be unrolled and techniques such as stride prefetching may be performed to avoid cache misses while iterating through the data array structure. These techniques assume that the address of subsequent objects may be calculated using the base of the data array structure. However, most LDSs do not have layout properties that may be exploited by stride prefetching techniques. Further, the gap between processor and memory speeds continues to increase. As a result, managed runtime environments (MRTEs) may encounter difficulties when attempting to insert prefetch instructions properly to reduce latencies while traversing LDSs.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
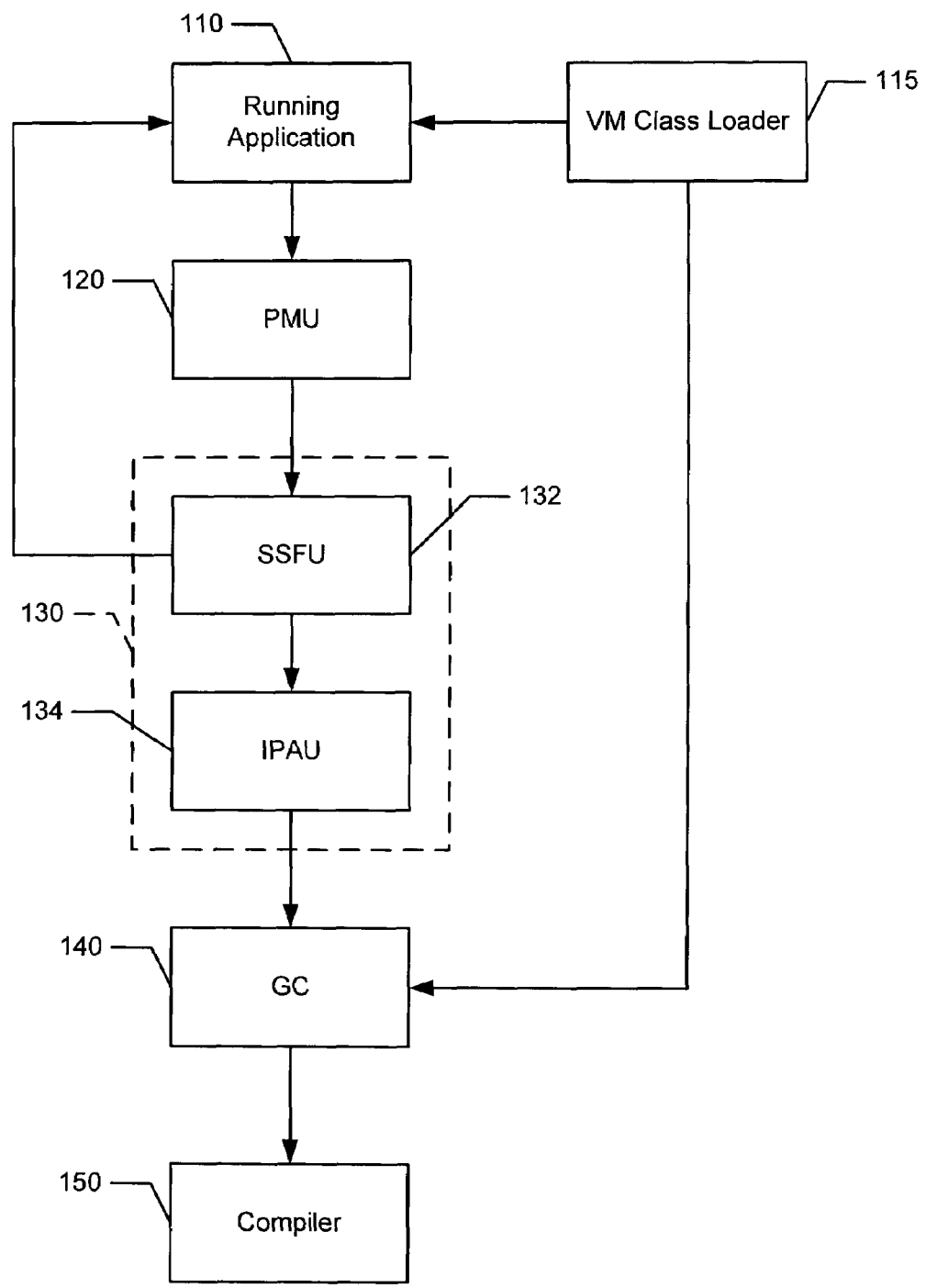
FIG. 1 is a block diagram representation of an example prefetch instruction insertion system.

In the example of FIG. 1, the illustrated prefetch instruction insertion system 100 includes a running application 110, a virtual machine (VM) class loader 115, a performance monitoring unit (PMU) 120, a VM 130, a garbage collector (GC) 140, and a compiler 150. The VM 130 includes a software statistical filtering unit (SSFU) 132 and an initial profitability analysis unit (IPAU) 134.

The running application 110 (also known as a mutator) includes one or more methods (i.e., functions, routines, or subroutines for manipulating data) compiled into instructions that a processor (e.g., the processor 1020 of FIG. 7) can execute. Persons of ordinary skill in the art will readily recognize that the VM class loader 115 is configured to maintain metadata structures such as a VTable (i.e., a virtual table), which includes information that uniquely identifies a class or type. A class provides a template for objects and describes how the objects are structured internally. An instance is an object created or instantiated from a class.

The PMU 120 is configured to identify and provide samples associated with cache misses when the running application 110 is executed under the control of a managed runtime environment (MRTE) to the VM 130. Each sample includes delinquent information such as an effective address causing a cache miss, an instruction pointer (IP) of an instruction (e.g., a load instruction) causing the cache miss, a thread that executed the instruction, and latency information. The effective address includes an address of data accessible by the load instruction. The IP includes an address of the instruction causing the cache miss. The latency information includes a number of cycle(s) required to service the cache miss.

Based on the delinquent information, the SSFU 132 selects one or more of the samples provided by the PMU 120 that are likely to be useful in optimizing cache performance. Samples not selected by the SSFU 132 are no longer processed. Samples are selected based on (1) their impact on performance, and (2) if delinquent indicators associated with the samples are concise. For example, the SSFU 132 may identify a sample associated with high-latency misses such as addresses that miss in all cache levels because the impact on performance is higher. In another example, the SSFU 132 may take samples from a selected set of (1) load instructions causing a majority of cache misses (i.e., delinquent loads), (2) types of objects where a majority of cache misses occurs (i.e., delinquent types), and/or (3) threads that contribute to a majority of cache misses (i.e., delinquent threads). The SSFU 132 may also identify and reject one or more of the samples that have been incorrectly generated and passed to the VM 130 by performing statistical validation of the samples from the PMU 120.

Further, the SSFU 132 provides a sample rate to the PMU 120 at which the PMU 120 identifies samples associated with cache misses. That is, the SSFU 132 may initially provide a high-sampling rate and gradually reduce the sampling rate to optimize overhead of the prefetch instruction insertion system 100. In a particular example, the SSFU 132 may exponentially reduce the sampling rate. The SSFU 132 may also control the sampling rate based on the results of the prefetch instruction insertion system 100. For example, the SSFU 132 may increase the sampling rate if the PMU 120 fails to identify and provide samples within a pre-determined time period. Alternatively, the SSFU 132 may decrease the sampling rate if the PMU 120 identifies and provides a number of samples greater than a threshold.

The IPAU 134 processes the filtered samples from the SSFU 132. In particular, the IPAU 134 compares the filtered samples to historical information. The IPAU 134 determines if further analysis is profitable (i.e., to optimize data access). If data access is further optimized by inserting prefetch instructions and/or improving data layout, the IPAU 134 determines the effect of such optimizations.

The IPAU 134 determines whether to perform further analysis if optimization has not been performed or if comparison of performance against existing optimization has already been performed. The IPAU 134 determines a performance impact (PI) indicator of data cache misses from a batch of samples. For example, the PI indicator is proportional to a constant and a number of samples contained in a particular batch (NS), and inversely proportional to an average number of delinquent threads in the batch of samples (NT), the sampling rate (SR), and time to collect the batch of samples (TIME) (i.e., PI=(constant*NS)/(NT*SR*TIME)). The average number of delinquent threads is an approximation of the contribution of a group of threads to the total number of cache misses. The IPAU 134 initiates further analysis in response to detecting a phase change. Phase change is detected if the number of threads generating samples is changed, if the number and/or composition of delinquent loads are changed, if the number and/or composition of delinquent types are changed, and/or if the PI indicator of a current batch of samples is greater than the PI indicator of a previous batch. Further analysis may not be necessary if optimization is performed, the number of delinquent types and delinquent loads is similar or reduced, and the current PI indicator is reduced relative to the previous PI indicator. The IPAU 134 is also configured to determine whether to change the sampling rate of the PMU 120 to reduce overhead or to get a sufficient number of samples.

The filtered samples are organized in delinquent regions (i.e., one or more memory regions with concentrated cache misses). The filtered samples are provided to GC 140. The GC 140 generates interesting paths of dependent objects by performing heap traversal on the delinquent regions. The GC 140 identifies a set of delinquent types based on the filtered samples. The GC 140 also generates delinquent paths based on the delinquent types and information from the heap traversal. Based on the IP information associated with the filtered samples, the GC 140 generates a list of IPs associated with each delinquent path. The list of IPs may be used by the compiler 150 to identify points to insert prefetch instructions.

The GC 140 is also configured to identify delta information between a base delinquent type and other delinquent types in a delinquent path based on the filtered samples and the delinquent paths. In particular, the GC 140 identifies a delta for each delinquent load associated with the base delinquent type of each delinquent path. The delta information includes offset information (i.e., a location within an object where the cache miss occurred). The compiler 150 may eliminate the need of pointer chasing across objects by inserting prefetch instructions at a relative offset from the base object in a path to hide the latency of the cache misses of the delinquent children further downstream on the path. Based on the delinquent paths and delta information, the GC 140 generates a delinquent path graph.

The compiler 150 generates a recompilation plan based on the delinquent path graph generated by the GC 140 and/or the analysis performed by the IPAU 134. If the GC 140 fails to identify interesting paths in the delinquent regions, the compiler 150 may identify locations to insert prefetch instructions. For example, the compiler 150 may identify locations to insert prefetch instructions if a delinquent type has only a few delinquent loads.

Figure 2:
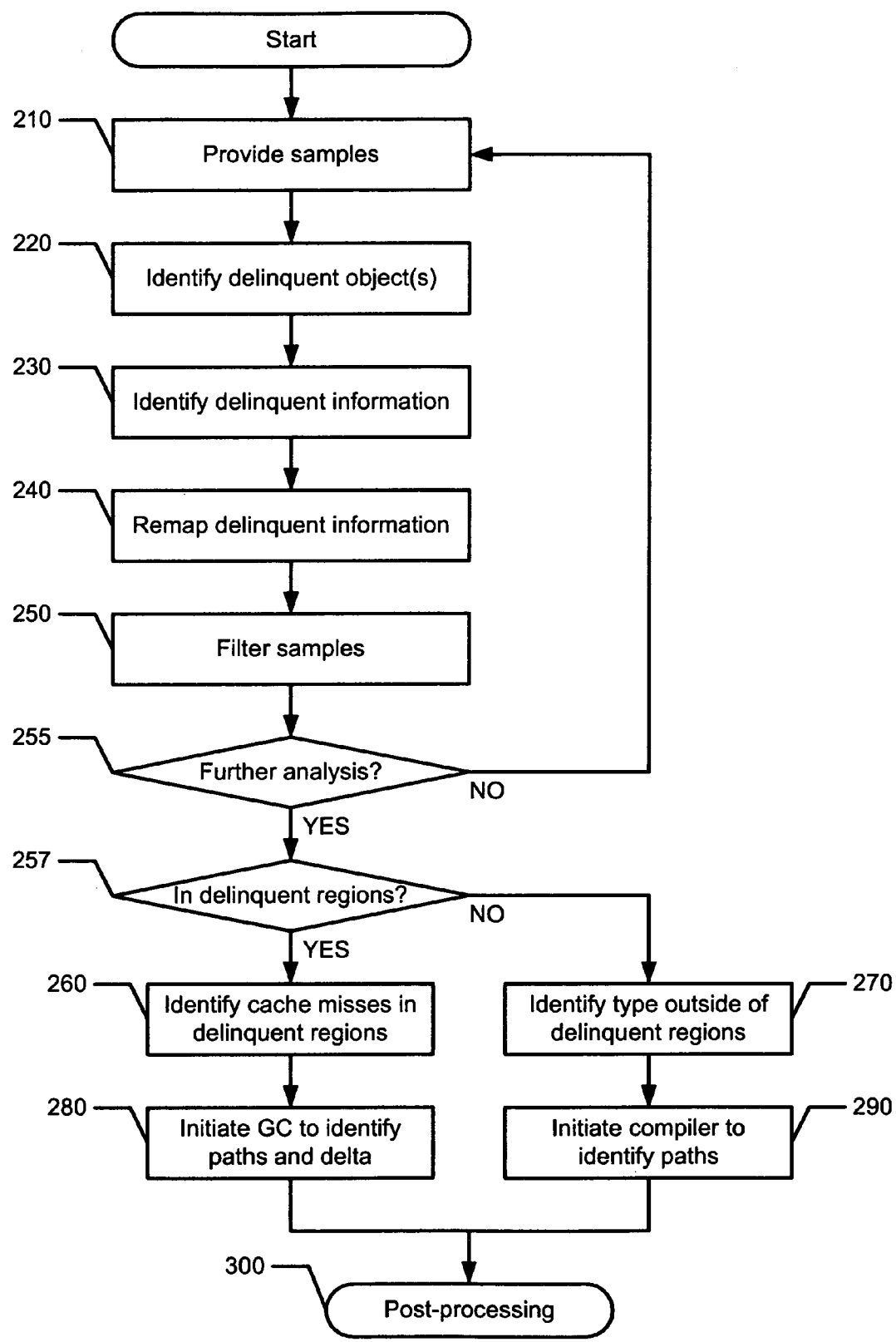
FIG. 2 is a flow diagram representation of example machine readable instructions that may be executed to cause the example prefetch instruction insertion system shown in FIG. 1 to insert prefetch instructions.

A flow diagram 200 representing machine readable instructions that may be executed by a processor to insert prefetch instructions is illustrated in FIG. 2. Persons of ordinary skill in the art will appreciate that the instructions may be implemented in any of many different ways utilizing any of many different programming codes stored on any of many computer or machine-readable mediums such as a volatile or nonvolatile memory or other mass storage device (e.g., a floppy disk, a CD, and a DVD). For example, the machine readable instructions may be embodied in a machine-readable medium such as an erasable programmable read only memory (EPROM), a read only memory (ROM), a random access memory (RAM), a magnetic media, an optical media, and/or any other suitable type of medium. Alternatively, the machine readable instructions may be embodied in a programmable gate array and/or an application specific integrated circuit (ASIC). Further, although a particular order of actions is illustrated in FIG. 2, persons of ordinary skill in the art will appreciate that these actions can be performed in other temporal sequences. Again, the flow diagram 200 is merely provided as an example of one way to insert prefetch instructions.

The flow diagram 200 begins with the PMU 120 identifying and providing a batch of samples associated with cache misses of an MRTE system to the VM 130 at a sample rate determined by the SSFU 132 (block 210). The VM 130 identifies delinquent objects from the batch of samples (block 220). The VM 130 also identifies delinquent information associated with each sample from the batch of samples (block 230). As noted above, each batch of samples includes delinquent information such as delinquent loads, delinquent types, delinquent regions, and/or delinquent threads. The delinquent loads include instruction addresses where most cache misses occur. Delinquent types include types of objects where most cache misses occur. Delinquent regions include memory region buckets where most cache misses occur. Each memory region bucket includes a number of contiguous memory addresses (e.g., one megabyte of memory (1 MB)). Delinquent threads include threads that generate the most cache misses.

The prefetch instruction insertion system 100 provides dynamic recompilation of the running application 110. Some delinquent loads may appear in methods that are recompiled versions of older methods. Thus, the VM 130 remaps the delinquent information (block 240). In particular, the older versions of delinquent loads are remapped to the latest version of the delinquent loads.

To reduce errors in identifying delinquent objects and to concentrate on samples with greater delinquent indicators, the SSFU 132 filters the batch of samples from the PMU 120

(block 250). For example, the SSFU 132 may discard samples with IPs that are not associated with any delinquent loads to concentrate on delinquent loads. To identify objects contributing to a significant number of cache misses, the SSFU 132 may discard samples with types that are not delinquent. The SSFU 132 may discard samples with types that are not important in the delinquent loads. The SSFU 132 may also discard samples with addresses that are not included in a delinquent region but included as dominant loads and/or dominant types, which are analyzed by the compiler 150. Such samples are not analyzed by the GC 140 because the GC 140 may not be configured to identify connections between objects in a low-cache miss region. Further, the SSFU 132 may discard samples of threads that do not generate a significant number of important cache misses and/or samples that do not point to areas in the heap.

Figure 3:
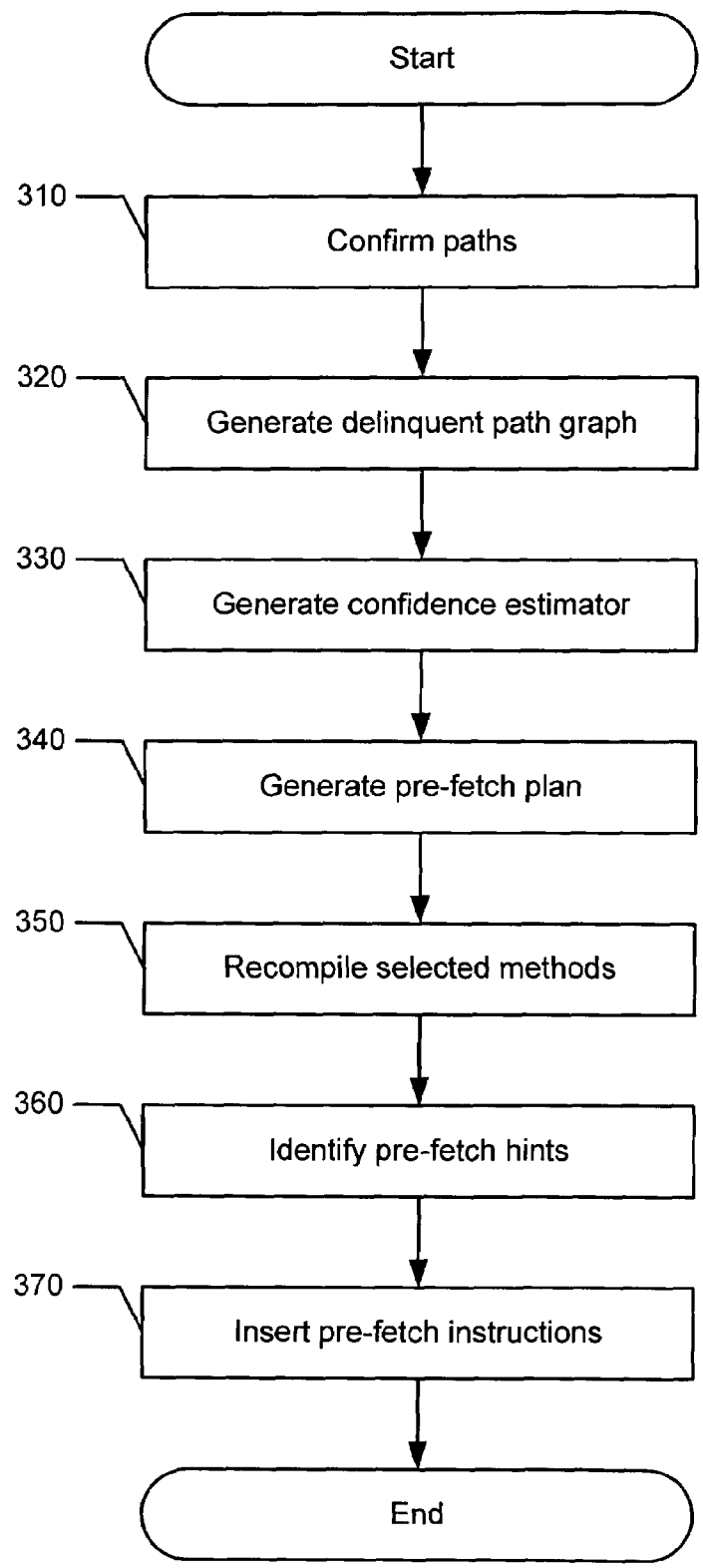
FIG. 3 is a flow diagram representation of example machine readable instructions that may be executed to cause the example prefetch instruction insertion system shown in FIG. 1 to perform post-processing.

The IPAU 134 determines whether further analysis is necessary as described in detail above (block 255). For example, IPAU 134 may generate the P1 indicator associated with the batch of samples from the PMU 120. If further analysis is not necessary, the PMU 120 continues to identify and provide samples to the VM 130. Otherwise, if further analysis is necessary (i.e., phase change), the IPAU 134 determines whether the cache misses are in the delinquent regions (block 257). If the cache misses are in the delinquent regions, the IPAU 134 identifies cache misses in the delinquent regions (block 260) and initiates the GC 140 to identify delinquent paths and deltas associated with the delinquent regions as described in detail above (block 280). Referring back to block 257, if the cache misses are outside the delinquent regions, the IPAU 134 identifies types outside of the delinquent regions (block 270) and initiates the compiler 150 to identify delinquent paths as described in detail above (block 290). Accordingly, the compiler 150 performs post-processing (block 300) (i.e., generates a recompilation plan to insert prefetch instructions) of the batch of samples from the PMU 120 as shown in FIG. 3.

To determine whether prefetch instructions will be effective, the compiler 150 confirms paths (block 310). Each path generated by the GC 140 includes a sequence of types, and each type includes IPs. However, the type sequences generated by the GC 140 may not contain information indicating when the types were accessed. Typically, the types are accessed in a rapid succession. Cache lines brought by prefetching for the child objects for a particular path may or may not be discarded by other cache misses that may occur after the base type is retrieved but before the child objects are accessed.

The compiler 150 matches IPs for the types in a path with a dynamic call graph, and estimates execution counts along the path. That is, the compiler 150 monitors for high-trip count loops or sections of code that are likely to discard cache lines brought by prefetch instructions. In particular, the compiler 150 identifies methods associated with the IPs for a path, and uses the execution count for the code for all the paths of the methods. If the execution count is even (i.e., no high-trip count loops are detected), the compiler 150 confirms the path. For example, assume that type A points to type B, both types A and B cause significant cache misses, two arrays (i.e., array A and array B) point to objects of both types A and B, respectively, and two separate loops access objects of types A and B through arrays A and B, respectively. The GC 140 may generate a path of type A pointing to type B because the cache misses associated with that particular path are more important than the cache misses produced in the two arrays. However, the first loop exhibits cache misses of objects of type A while the second loop exhibits misses of objects of type B. Therefore, a prefetch instruction inserted in the first loop from type A on behalf of type B may be ineffective. Thus, the compiler 150 may not confirm this particular path because two high-trip count loops with high execution frequency independently access objects of type A and type B.

The compiler 150 may also confirm the path if the IPs are all contained in a loop because a prefetch instruction may be effective. Further, the compiler 150 may use the batch of samples from the PMU 120 to match against a dynamic call graph obtained by other means, for example, using the MRTE system services as persons of ordinary skill in the art will readily recognize. A dynamic call graph is a graph that expresses the methods called by a particular method. Further, the graph is continuously updated at runtime (i.e., dynamic). The IP of each sample provided by the PMU 120 is searched in the dynamic call graph to identify the basic block of the method where the IP belongs. Basic block profile information obtained by other means is used to estimate the execution counts between two IP points. The profile information is analyzed along a path of two or more IP points. The distribution of profile information misses along the path may be used to estimate the benefit of a prefetch instruction. If the distribution is even, the compiler 150 confirms the path. However, a high trip-count loop is executed if the distribution is uneven (i.e., high execution counts intermixed with low execution counts), which may throw off the prefetch instruction. Thus, the compiler 150 rejects the path.

Figure 4:
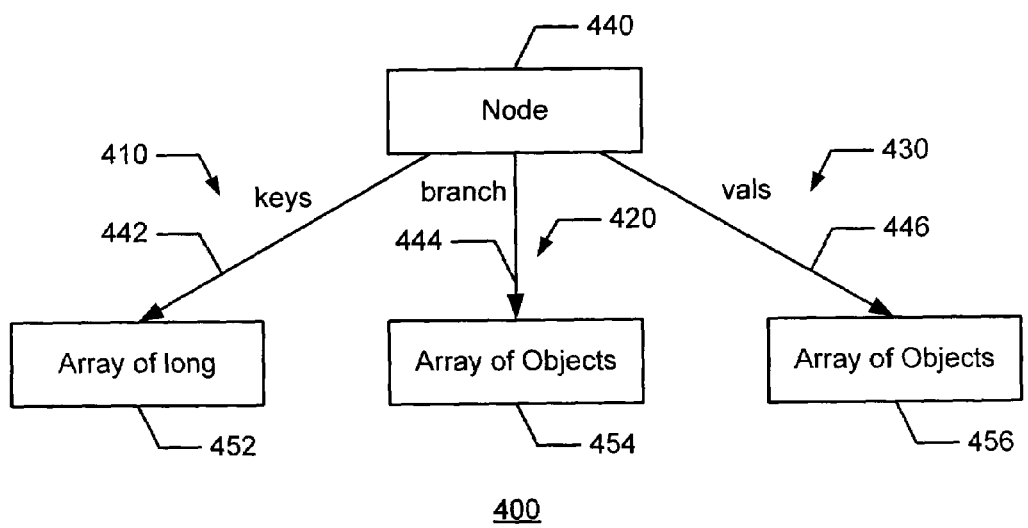
FIG. 4 is a block diagram representation of an example delinquent type graph.

The analysis from the GC 140 and/or the compiler 150 (i.e., blocks 280 and/or 290, respectively, in FIG. 2) generates a series of delinquent paths and delta information. Accordingly, the compiler 150 generates a delinquent type graph to determine whether the series of delinquent paths share a common base type (i.e., to combine delinquent paths) (block 320). If the series of delinquent paths share a common base type and a prefetch point, the deltas associated with the series of delinquent paths may be combined to reduce redundant prefetching. In the example of FIG. 4, the analysis from the GC 140 and/or the compiler 150 generated three paths, generally shown as 410, 420, and 430. In particular, the first path 410 is from node 440 to array of long 452 via the field "keys" 442, the second path 420 is from node 440 to array of objects 454 via the field "branch" 444, and the third path 430 is from node 440 to array of objects 456 via the field "vals" 446. The compiler 150 combines the three paths 410, 420, and 430 to issue a prefetch instruction from node 440 for the three objects 452, 454, and 456 pointed out by the fields 442, 444, and 446. To combine deltas, the compiler 150 searches for matching base types that share similar delinquent loads. The matching base types are combined into a single type with several child types. The compiler 150 combines the deltas of the child types if a match is found. In particular, if the deltas indicate that the three child types are arranged consecutively, the compiler 150 may inject a single prefetch instruction for the shared cache lines. For example, the compiler 150 may match the IP associated with each of the base types in the three paths. If two base types in two paths share very similar delinquent loads, the compiler 150 may join or combine the two base types because the two base types are from the same code.

Referring back to FIG. 3, the compiler 150 generates confidence estimators to provide greater accuracy in locating prefetch instructions because delta values may not always be accurate. For example, alignment of two objects may result in the child object being on different cache lines even if the two objects are separated by a fixed distance. In another example, delta values may be inaccurate with objects of variable size in between objects connected by a path. Confidence estimators may reduce cache pollution and provide more precise prefetches.

Figure 5:
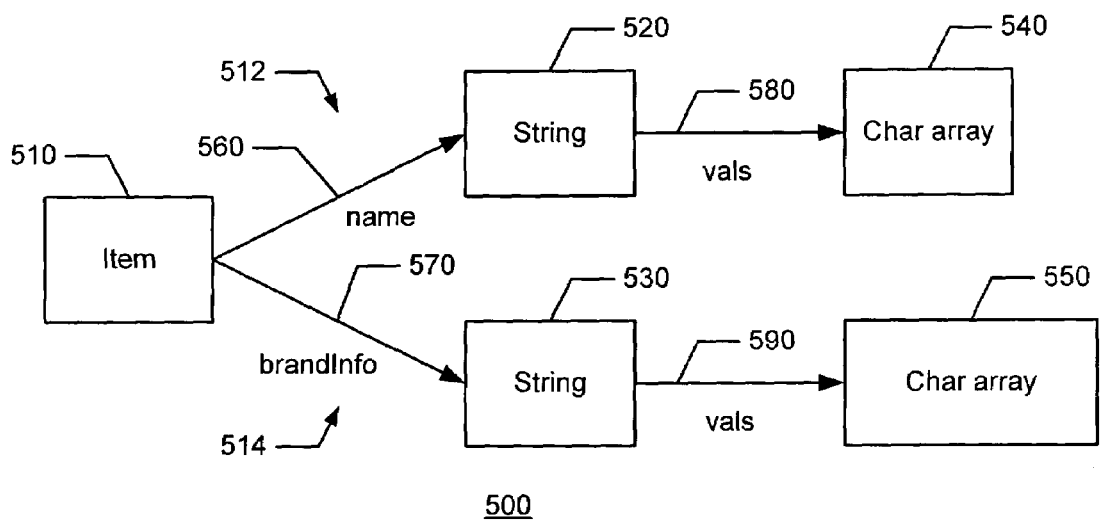
FIG. 5 is a block diagram representation of an example path graph.

The compiler 150 combines independent confidence estimators to generate a global confidence estimator for cache lines including objects adjacent in a path graph. In the example of FIG. 5, the illustrated path graph 500 includes type "Item" 510, type "String" 520, 530, and type "Char array" 540, 550. Based on the types, the path graph 500 includes two common paths. In a first path 512, type "Item" 510 points to an instance of type "String" 520 via field "name" 560, which in turn, points to an instance of "Char array" 540 via field "vals" 580. In a second path 514, type "brandInfo" 570 points to another instance of type "String" 530 via field "brandInfo" 570, which in turn, points to another instance of type "Char array" 550 via field "vals" 590. However, "Char array" 540 and "Char array" 550 may be different sizes.

Figure 6:
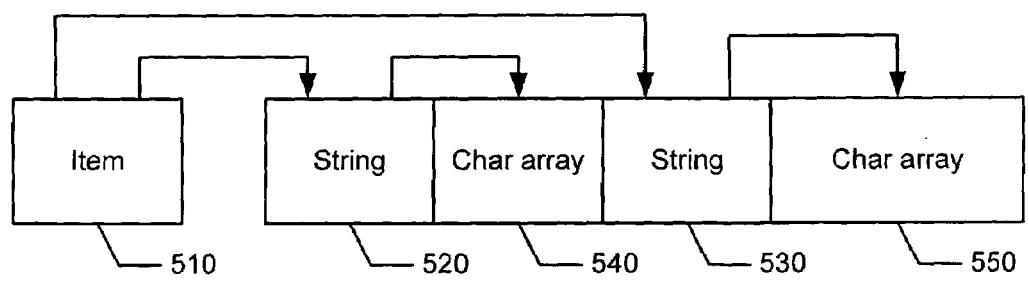
FIG. 6 is a block diagram representation of an example allocation sequence of the path graph shown in FIG. 5.

In the example of FIG. 6, the illustrated allocation sequence 600 is based on the path graph 500. As illustrated in the allocation sequence 600 of FIG. 6, there is relatively little confidence in the delta distance between the base path (i.e., type "Item" 510) and the objects along either the first path 512 or the second path 514 of FIG. 5. However, if the compiler 150 combines the confidence estimator of the first and second paths 512, 514, the compiler 150 may capture objects of either the first or second paths 512, 514 by prefetching selected cache lines that otherwise would have a lower probability of containing an object of either the first or second paths 512, 514 individually. As noted above, "Char array" 540 and "Char array" 550 may vary in size. If the first path 512 and the second path 514 are considered independently, the varying size of the "Char array" 540 reduces the accuracy of the deltas between the type "Item" 510, "String" 530, and "Char array" 550. However, if the first and second paths 512, 514 are combined as shown in FIG. 6 and the deltas are combined, the resulting prefetch may help along one of the first and second paths 512, 514.

The compiler 150 combines the first and second paths 512, 514 by analyzing corresponding delta histograms and assigning one or more confidence values to each of the cache lines derived from the individual deltas. The compiler 150 sums up the confidence estimators for each of the cache lines to generate the confidence estimator. If the confidence estimator is greater than a threshold then the compiler prefetches the cache line.

Figure 7:
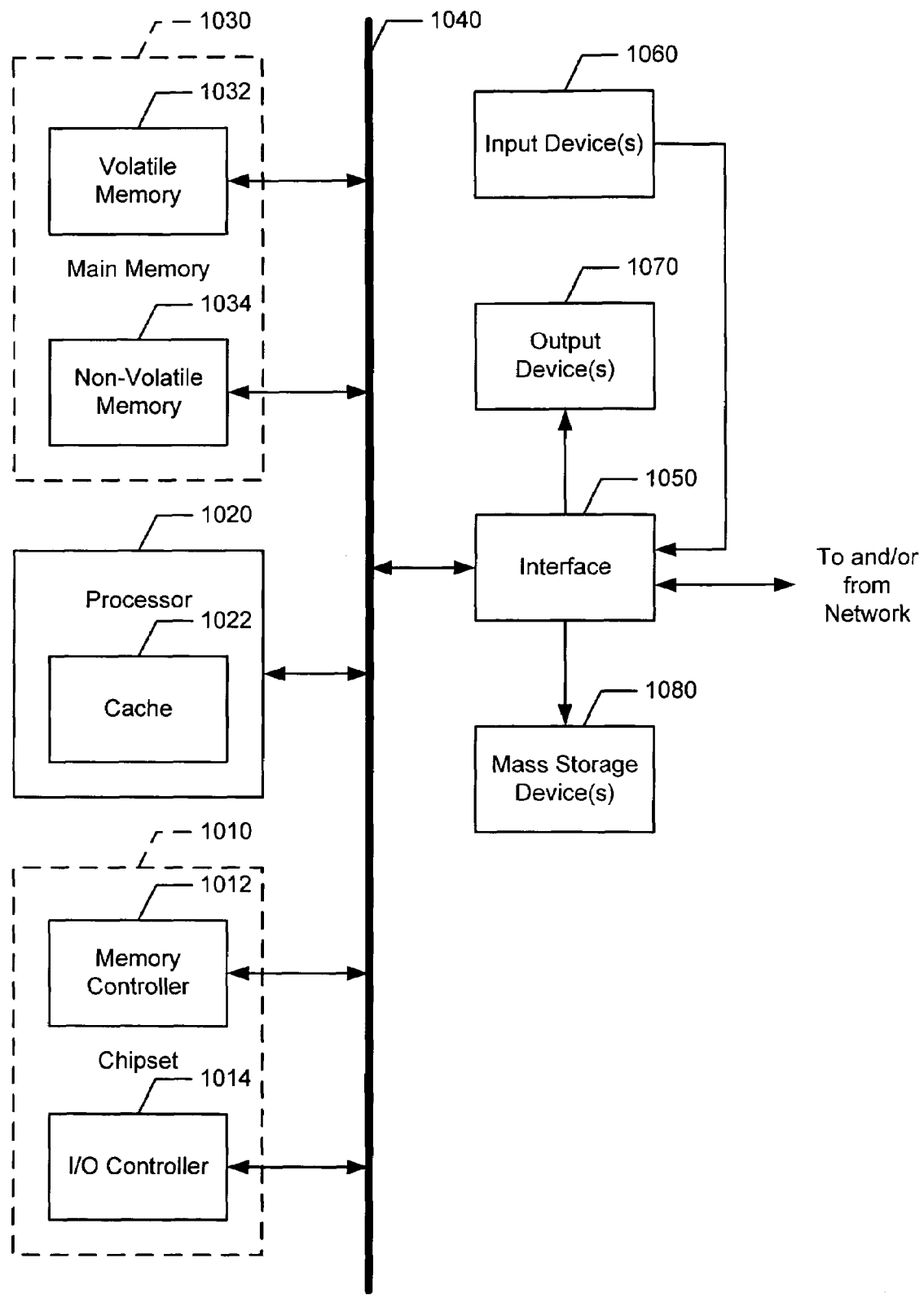
FIG. 7 is a block diagram representation of an example processor system that may be used to implement the example prefetch instruction insertion system shown in FIG. 1.

FIG. 7 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 7 provides memory and I/O management functions, as well as a plurality of general purpose and/or special purpose registers, timers, etc. that are accessible or used by a processor 1020. The processor 1020 is implemented using one or more processors. For example, the processor 1020 may be implemented using one or more of the Intel® Pentium® technology, the Intel® Itanium® technology, Intel® Centrino™ technology, and/or the Intel® XScale® technology. In the alternative, other processing technology may be used to implement the processor 1020. The processor 1020 includes a cache 1022, which may be implemented using a first-level unified cache (L1), a second-level unified cache (L2), a third-level unified cache (L3), and/or any other suitable structures to store data as persons of ordinary skill in the-art will readily recognize.

As is conventional, the volatile memory controller 1036 and the non-volatile memory controller 1038 perform functions that enable the processor 1020 to access and communicate with a main memory 1030 including a volatile memory 1032 and a non-volatile memory 1034 via a bus 1040. The volatile memory 1032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 7 are depicted as separate blocks within the processor system 1000, the functions performed by some of these blocks may be integrated within a single semiconductor circuit or may be implemented using two or more separate integrated circuits. For example, although the I/O controller 1014, the volatile memory controller 1036, and the non-volatile memory controllers 1038 are depicted as separate blocks, persons of ordinary skill in the art will readily appreciate that the I/O controller 1014, the volatile memory controller 1036, and the non-volatile memory controllers 1038 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method comprising:
   receiving one or more batches of samples associated with cache misses from a performance monitoring unit in a processor system;
   selecting one or more samples from the one or more batches of samples based on delinquent information;
   generating a performance impact indicator associated with the one or more samples;
   determining whether to initiate a delinquent path identification analysis based on the performance impact indicator;
   when the delinquent path identification analysis is initiated, determining whether the cache misses are in a delinquent region;
      when the cache misses are in the delinquent region, initiating a garbage collector analysis to attempt to identify one or more delinquent paths;
      when the cache misses are not in the delinquent region, initiating a compiler analysis to attempt identify one or more delinquent paths; and
      identifying one or more prefetch points to insert prefetch instructions based on one of the garbage collector analysis and the compiler analysis.

2. A method as defined in claim 1, wherein the delinquent information comprises at least one of a delinquent region, a delinquent object, a delinquent load, and a delinquent thread.

3. A method as defined in claim 1, wherein initiating the garbage collector analysis comprises causing a garbage collector to attempt to identify the one or more delinquent paths and one or more deltas associated with one or more delinquent regions.

4. A method as defined in claim 1, wherein identifying the one or more prefetch points comprises generating a global confidence estimator associated with the one or more prefetch points.

5. A method as defined in claim 1, wherein identifying the one or more prefetch points comprises confirming the one or more delinquent paths.

6. A method as defined in claim 1 further comprising selecting a sampling rate for receiving the one or more batches of samples from the performance monitoring unit.

7. A machine readable medium storing instructions, which when executed, cause a machine to:
   receive one or more batches of samples associated with cache misses from a performance monitoring unit in a processor system;
   select one or more samples from the one or more batches of samples based on delinquent information;
   generate a performance impact indicator associated with the one or more samples;
   identify to the performance monitoring unit a sampling rate for receiving the one or more batches of samples;
   initiate at least one of a garbage collector analysis and a compiler analysis to identify one or more delinquent paths; and
   identify one or more prefetch points to insert prefetch instructions based on the at least one of the garbage collector analysis and the compiler analysis.

8. A machine readable medium as defined in claim 7, wherein the delinquent information comprises at least one of a delinquent region, a delinquent object, a delinquent load, and a delinquent thread.

9. A machine readable medium as defined in claim 7, wherein, if the cache misses are in a delinquent region, the instructions, when executed, cause the machine to initiate the garbage collector analysis by initiating a garbage collector to attempt to identify one or more delinquent paths and deltas.

10. A machine readable medium as defined in claim 7, wherein, if the cache misses are not in a delinquent region, the instructions, when executed, cause the machine to initiate the by causing a compiler to attempt to identify one or more delinquent paths.

11. A machine readable medium as defined in claim 7, wherein the instructions, when executed, cause the machine to identify the one or more prefetch points to insert the prefetch instructions by generating a global confidence estimator associated with the one or more prefetch points.

12. A machine readable medium as defined in claim 7, wherein the instructions, when executed, cause the machine to identify the one or more prefetch points to insert the prefetch instructions by confirming the one or more delinquent paths.

13. A machine readable medium as defined in claim 7, wherein the machine readable medium comprises at least one of a programmable gate array, an application specific integrated circuit, erasable programmable read only memory, read only memory, random access memory, a magnetic medium, and an optical medium.

\* \* \* \* \*

UNITED STATES PATENT AND TRADEMARK OFFICE
CERTIFICATE OF CORRECTION

| | | |
|---|---|---|
| PATENT NO. | : 7,389,385 B2 | Page 1 of 1 |
| APPLICATION NO. | : 10/742009 | |
| DATED | : June 17, 2008 | |
| INVENTOR(S) | : Serrano et al. | |

It is certified that error appears in the above-identified patent and that said Letters Patent is hereby corrected as shown below:

On The Title Page Item (56): add -- 20030145314 A1    7/2003 Nguyen et al. ...........717/158 -- to the list of U.S. Patent Documents.

Col. 9, line 31:   replace "attempt identify" with -- attempt to identify --.

Col. 10, line 34:   replace "the by" with -- the compiler analysis by --.

Signed and Sealed this

Twenty-sixth Day of August, 2008

JON W. DUDAS
*Director of the United States Patent and Trademark Office*